Patented Aug. 5, 1924.

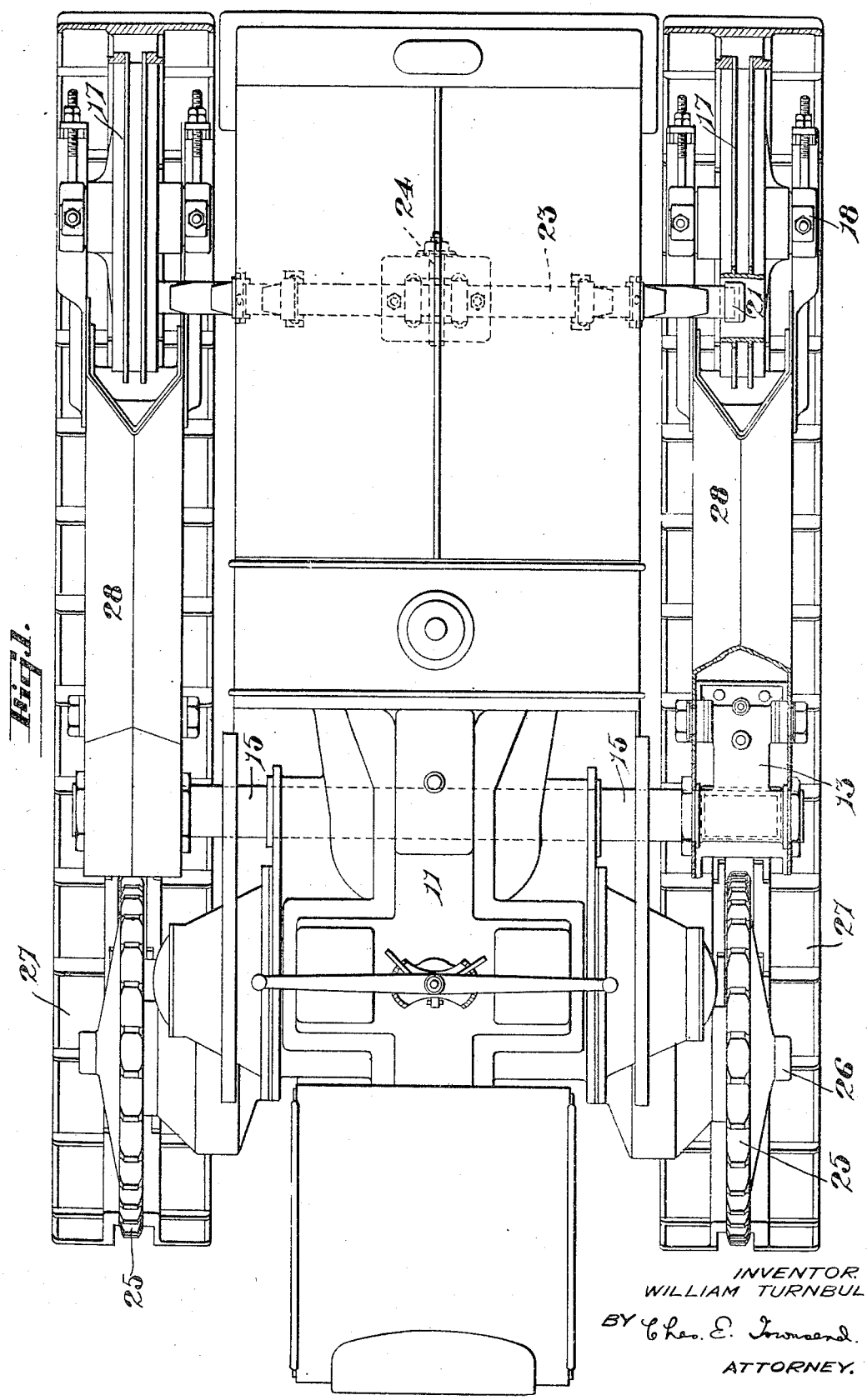

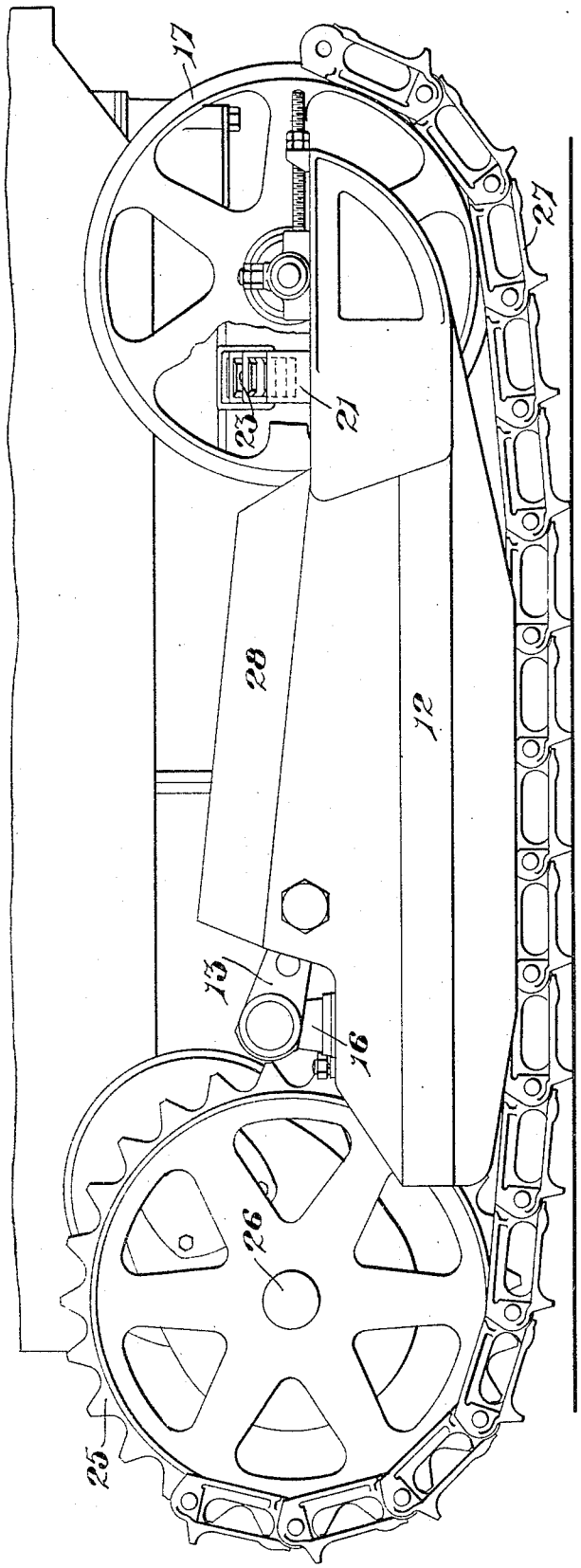
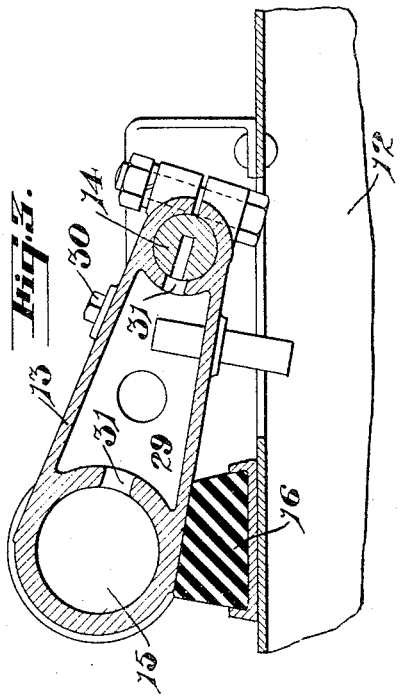

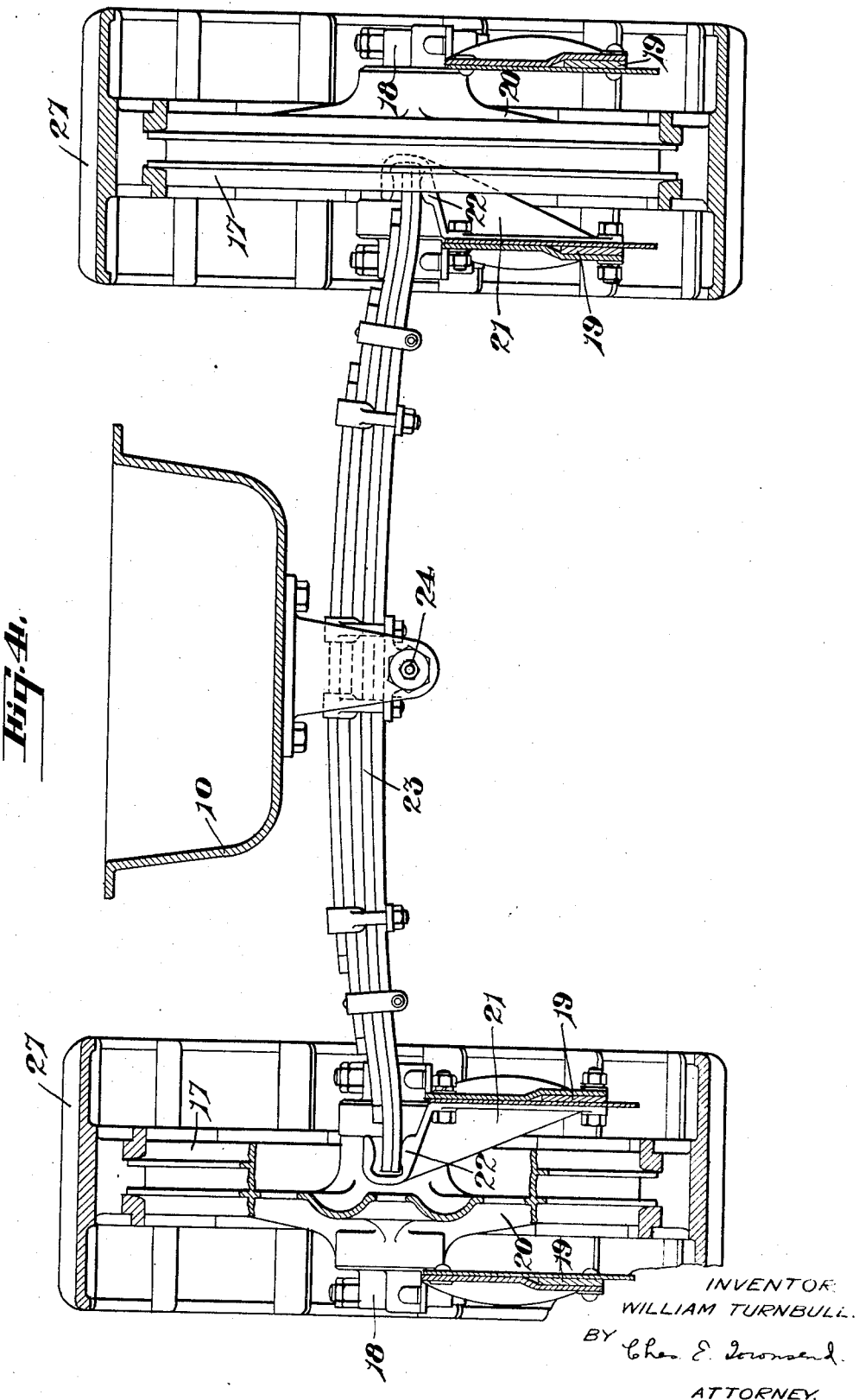

1,503,615

UNITED STATES PATENT OFFICE.

WILLIAM TURNBULL, OF PEORIA, ILLINOIS, ASSIGNOR TO THE HOLT MANUFACTURING COMPANY, OF STOCKTON, CALIFORNIA, A CORPORATION OF CALIFORNIA.

TRACTOR SUSPENSION.

Application filed January 4, 1922. Serial No. 526,962.

*To all whom it may concern:*

Be it known that I, WILLIAM TURNBULL, a citizen of the United States, residing at Peoria, in the county of Peoria and State of Illinois, have invented new and useful Improvements in Tractor Suspensions, of which the following is a specification.

This invention relates to tractor suspension means, and has for its object to simplify and improve the construction and operation of a suspension for tractors of the self-laying track type.

The type of suspension involved herein is of the three-point type and one of the purposes of the present invention is to avoid the tendency of the truck frames to toe out at the forward end. Another purpose is to hinge the truck frames at the rear so that the front and rear sprocket wheels can move toward each other under extraordinary stresses, as, for instance, in case a rock or other unyielding obstruction should get between the sprocket wheel and track. The suspension means at the rear also makes is possible to dispense with the usual separate main frame, and provision is made therein for cushioning the suspended weight and for efficiently lubricating the joints in the hinged connection.

One form which my invention may assume is exemplified in the following description and illustrated in the accompanying drawing, in which—

Fig. 1 shows a plan view of a tractor embodying my invention.

Fig. 2 shows a side elevation of the same.

Fig. 3 shows a detail of the rear suspension means, including the thrust link.

Fig. 4 shows a transverse sectional view through the front end of the truck frames illustrating the single point equalizing connection.

The tractor frame herein shown is formed by the engine crank case 10 and transmission housing 11. At each side of the tractor frame is a truck frame 12 having a thrust link 13 pivotally connected near its rear end, as shown at 14. This thrust link extends upwardly and rearwardly where it is pivotally connected to a trunnion 15, the latter extending through the transmission housing 11. The upper end of the thrust member 13 rests upon a cushion block 16 seated upon the top of the truck frame. This arrangement constitutes one point of support between the truck frame and tractor frame and the same mechanism is duplicated at the opposite side.

At the front of each truck frame is a blank sprocket wheel 17 journaled at 18 between side plates 19 of the truck frame. The sprocket wheel 17 is dished outwardly, as shown at 20. On the inside of the inner side plate 19 is a bracket 21 extending upwardly and projecting inside of the dished-out portion of the sprocket wheel at the rear of the journals 18. This bracket forms a seat 22 for one end of an equalizing bar 23. The equalizing bar is pivoted at its center 24 to the under side of the crank case 10. This equalizing bar is shown as being in the form of a laminated spring and the construction just described is duplicated on the opposite side of the tractor.

At the rear of the tractor frame is a driving sprocket wheel 25 which is journaled on a shaft 26 extending out from the transmission housing. The sprocket wheel itself sustains no weight of the load and is driven and steered in any suitable way by gearing contained within the transmission housing.

An endless chain track 27 passes around the front and rear sprocket wheels at each side and forms a track for the rollers or other anti-friction devices carried by the truck frames. A shed roof 28 is preferably used on each truck frame.

The thrust link 13 is hollowed out to form a receptacle 29 to contain oil, being filled through a plug 30. This oil is fed to the bearing surfaces at either end through ports 31.

By having the ends of the equalizer bar seated in the manner described the weight of the front end of the tractor is transmitted to each truck frame at a point approximately on a middle line of the latter. This affords an advantage over prior structures, wherein the ends of the equalizer bar are connected inside the center line of the trucks, in that all tendency of the truck frames to toe out is thereby avoided.

The inclined thrust link disclosed herein will allow of production of slack in the track when unyielding obstruction enters between the track and sprocket wheels, inasmuch as the angle is such as to cause the rear end of the tractor frame to be raised and permit the truck frame, with its connected front sprocket wheel, to approach the rear sprocket wheel. The cushion block 16, which is preferably formed of rubber, affords a very simple and effective cushioning means for the rear of the tractor frame.

Various changes in the construction and arrangement of the several parts herein shown and described may be employed without departing from the spirit of my invention as disclosed in the appended claims.

Having thus described my invention, what I claim and desire to secure by Letters Patent is:

1. In a vehicle having a main frame and a rocking truck frame at each side thereof, the latter formed of spaced side bars, a sprocket wheel journaled between the side bars and formed with an outwardly dished member between the hub and rim, an equalizing device connecting the truck frames together and also connected with the main frame, the connection between the equalizing device and each truck frame including a support carried on the inner side bar of the truck frame and projecting into the dished portion of the sprocket wheel.

2. In a vehicle, a main frame, a truck frame at each side thereof, the latter formed of spaced side bars, a sprocket wheel journaled between the side bars and formed with an outwardly dished member between the hub and rim, a transverse equalizing bar connecting the truck frames together, said bar being connected at its center to the main frame, the connections between the ends of the equalizing bar and the truck frames including supports carried on the inner side bars of the truck frames and projecting into the dished portions of the sprocket wheels, whereby to transmit the load to the truck frames approximately on the center lines thereof.

3. In a vehicle, a main frame carrying a rear sprocket at each side thereof, a truck frame at each side of the main frame and carrying a front sprocket for cooperation with the adjacent sprocket on the main frame, and a thrust connection between the main frame and each truck frame at the rear of the latter whereby to permit movement of the front sprocket toward the rear sprocket under extraordinary stresses, said thrust connection comprising a link pivotally connected to the main frame and to the adjacent truck frame.

4. In a vehicle, a main frame carrying a rear sprocket at each side thereof, a truck frame at each side of the main frame and carrying a front sprocket for cooperation with the adjacent sprocket on the main frame, a thrust connection between the main frame and each truck frame at the rear of the latter whereby to permit movement of the front sprocket toward the rear sprocket under extraordinary stresses, said thrust connection comprising a trunnion secured to the main frame at each side thereof and projecting over the adjacent truck frame, and a thrust link rotatably mounted on each trunnion and extending forwardly and pivotally connected to the adjacent truck frame.

5. In a vehicle, a main frame carrying a rear sprocket at each side thereof, a truck frame at each side of the main frame and carrying a front sprocket for cooperation with the adjacent sprocket on the main frame, a thrust connection between the main frame and each truck frame at the rear of the latter whereby to permit movement of the front sprocket toward the rear sprocket under extraordinary stresses, said thrust connection comprising a weight-transmitting member secured to the main frame at each side thereof, and projecting over the adjacent truck frame, a thrust link pivotally connected to the weight-transmitting member and extending forwardly and downwardly and pivotally connected to the adjacent truck frame, and a cushion block interposed between the truck frame and the overlying weight transmitting member.

6. In a vehicle, a main frame carrying a rear sprocket at each side thereof, a truck frame at each side of the main frame and carrying a front sprocket for cooperation with the adjacent sprocket on the main frame, a thrust connection between the main frame and each truck frame at the rear of the latter whereby to permit movement of the front sprocket toward the rear sprocket under extraordinary stresses, said connection comprising a trunnion extending through the transmission housing and projecting over each truck frame, a thrust link rotatably mounted on each end of the trunnion extending forwardly and pivotally connected to the adjacent truck frame, and a resilient member interposed between each truck frame and the overlying trunnion.

WILLIAM TURNBULL.